United States Patent [19]
Chiang

[11] Patent Number: 5,882,016
[45] Date of Patent: Mar. 16, 1999

[54] SOFT GRIP KEYLESS CHUCK ASSEMBLY

[75] Inventor: Chi-Kin Chiang, Anderson, S.C.

[73] Assignee: Ryobi North America, Inc., Anderson, S.C.

[21] Appl. No.: 895,771

[22] Filed: Jul. 17, 1997

[51] Int. Cl.$^6$ .................................................. B23B 31/12
[52] U.S. Cl. ............................. 279/62; 279/60; 279/158; 279/902; 81/489
[58] Field of Search .............................. 279/60–65, 902, 279/158; 81/177.1, 489

[56] References Cited

U.S. PATENT DOCUMENTS

| | | | |
|---|---|---|---|
| 4,460,296 | 7/1984 | Siverston, Jr. ........................ | 279/902 |
| 5,452,906 | 9/1995 | Huff et al. ............................ | 279/62 |
| 5,476,273 | 12/1995 | Shadeck et al. ..................... | 279/60 |
| 5,601,003 | 2/1997 | Amtenbrink et al. ................ | 81/489 |

FOREIGN PATENT DOCUMENTS

| | | | |
|---|---|---|---|
| 2635998 | 3/1990 | France .................................. | 81/489 |

*Primary Examiner*—Steven C. Bishop
*Attorney, Agent, or Firm*—Brooks & Kushman P.C.

[57] ABSTRACT

A chuck assembly for use with a rotary tool includes a chuck mechanism having a plurality of spaced apart jaws. The jaw spacing is adjusted by rotation of an adjustment ring. A sleeve encircles and is affixed to the adjustment ring. A plurality of spaced apart ribs radially extend from the sleeve. An elastomeric grip extends generally circumferentially about the sleeve. The ribs radially protrude from the grip at a plurality of openings defined by the grip. The ribs lie in outboard shielding relationship to the grip to protect the grip from excessive wear and damage due to contact with other objects during operation of the rotary tool.

20 Claims, 2 Drawing Sheets

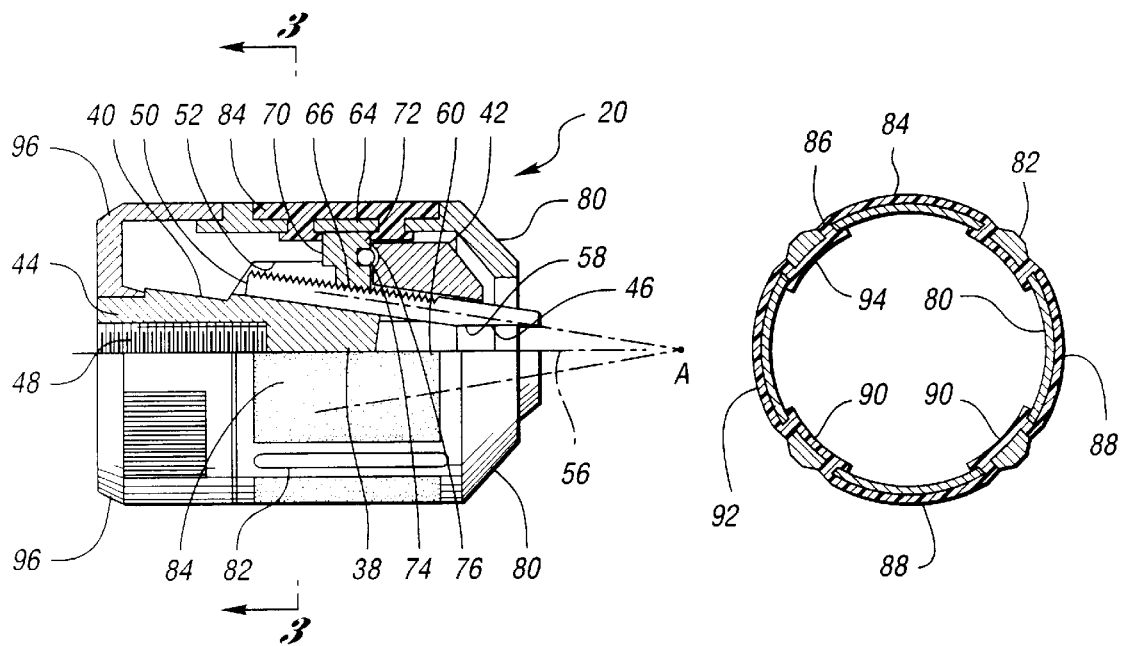
Fig. 2
Fig. 3
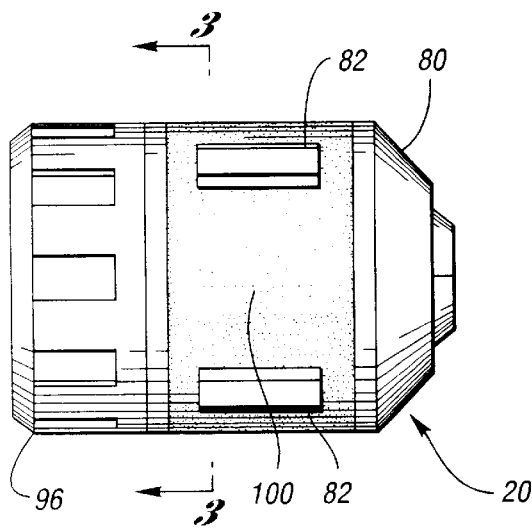
Fig. 4
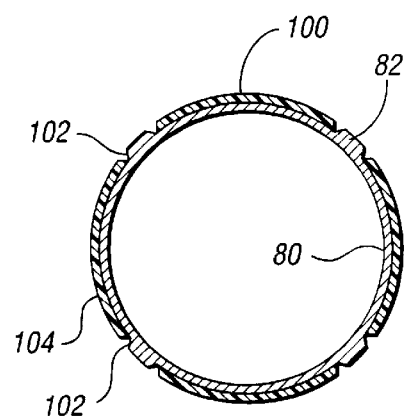
Fig. 5

SOFT GRIP KEYLESS CHUCK ASSEMBLY

TECHNICAL FIELD

The present invention relates to soft grip keyless chuck assemblies for use in rotary tools.

BACKGROUND ART

In conventional hand-powered, electric-powered, and pneumatic-powered tool drivers, adjustable chucks are used for holding a tool such as a drill bit. A conventional chuck has a conical body threaded onto the drive shaft of the rotary tool. Three jaws spaced circumferentially 120° apart from each other are constrained in passageways defined by the chuck body. The spacing between the jaws is adjusted by rotating an adjustment ring which encircles the chuck body. Such a chuck is keyless when the adjustment ring is rotated by hand.

Several attempts have been made to provide grip boots having high coefficients of friction for improving the user's grip on a chuck, especially a keyless chuck. For example, U.S. Pat. Nos. 5,452,906 issued to Huff et al. and 5,476,273 issued to Shadeck et al. each discuss the use of grip boots for improving the user's grip on a chuck.

One problem associated with soft grip chucks is the fact that the soft grip material is not very durable. When using a drill having a soft grip chuck to drill in a small constrained location, incidental contact of the rotating chuck with another object, such as an obstructing portion of the workpiece, may damage the soft grip material. This excessive wearing and damaging of the soft grip is very undesirable.

SUMMARY OF THE INVENTION

It is therefore an object of the present invention to provide an improved soft grip chuck assembly.

It is another object of the present invention to provide an improved rotary tool having a soft grip keyless chuck assembly.

In carrying out the above objects and other objects and features of the present invention, a chuck assembly is provided. The chuck assembly includes a chuck mechanism having a plurality of spaced apart jaws. The jaw spacing is adjusted by rotation of an adjustment ring. A sleeve encircles and is affixed to the adjustment ring. A plurality of spaced apart ribs radially extend from the sleeve outer surface.

An elastomeric grip extends generally circumferentially about the sleeve. The ribs radially protrude from the grip at a plurality of openings defined by the grip. The spaced apart ribs lie in outboard shielding relationship to the grip to shield the grip from excessive wear or damage.

In one embodiment, the sleeve is formed by the injection molding of a hard plastic material. The grip is formed by insert molding an elastomeric material about the sleeve.

The grip includes a plurality of gripping portions and a plurality of securing portions. The ribs are located between adjacent gripping portions which are formed along the sleeve outer surface. The grip is secured to the sleeve at each rib by the securing portions which are formed along the sleeve interior surface.

The advantages accruing to the present invention are numerous. For example, the shielding ribs protect the elastomeric material from contact with objects in the work area. This prevents excessive wear or damage to the grip.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 2 is an enlarged view, partially in section, of the chuck assembly of FIG. 1;

FIG. 3 is a cross-sectional view of the chuck assembly of FIG. 1, taken along line 3—3 of FIG. 1;

FIG. 4 is an enlarged view of an alternative embodiment of a chuck assembly of the present invention; and FIG. 5 is a cross-sectional view of the chuck assembly of FIG. 4, taken along line 5—5 of FIG. 4.

BEST MODE FOR CARRYING OUT THE INVENTION

Figure 1:
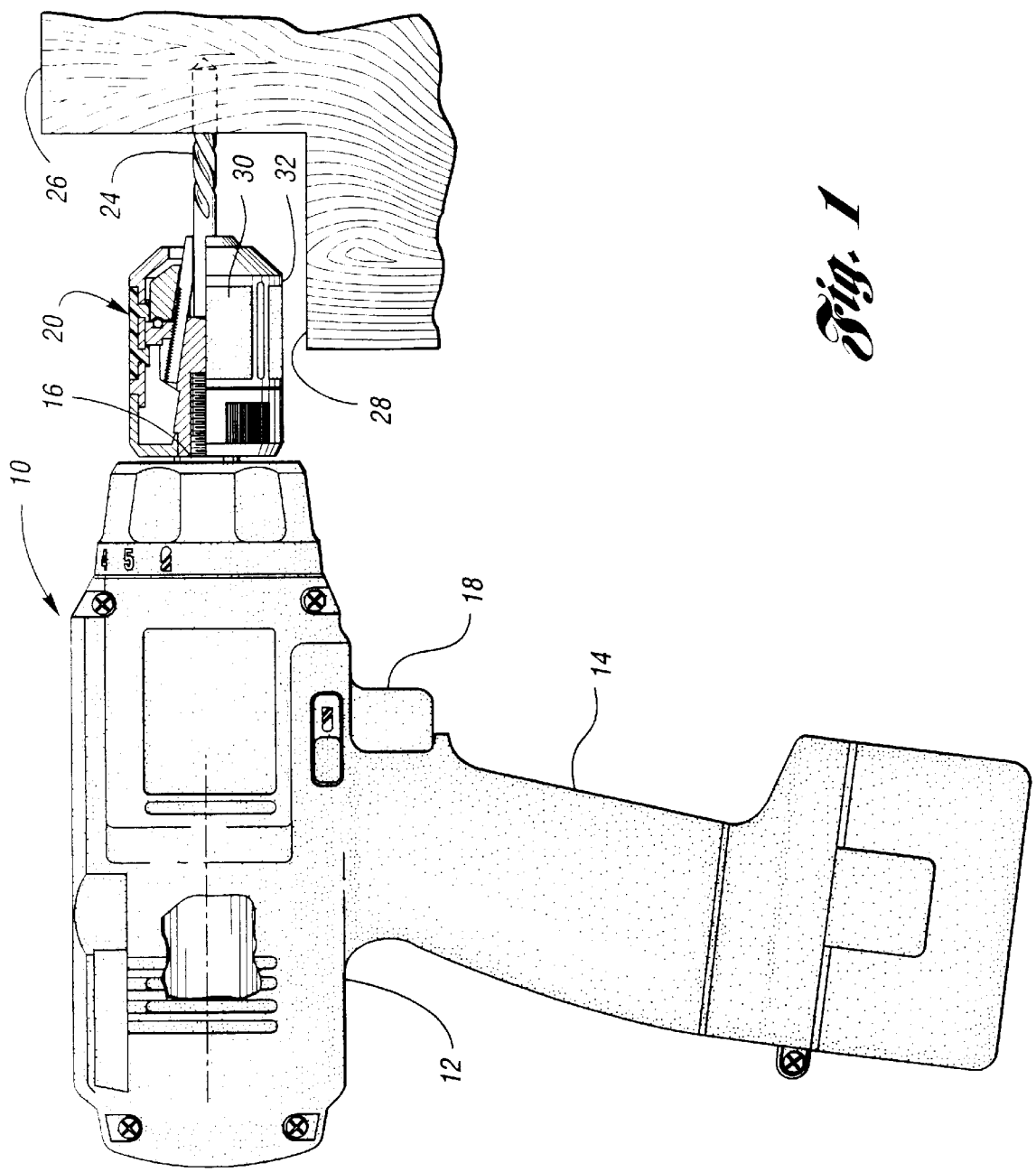
FIG. 1 is a drill having a chuck assembly, partially in section, made in accordance with the present invention.

Referring now to FIG. 1, an electric drill made in accordance with the present invention is generally indicated at 10. The electric drill 10 includes a motor 12 disposed in a housing 14. The motor 12 is operable to drive a drive shaft 16. As shown, the drill 10 is battery-powered; however, the drill 10 may be powered by a conventional AC power source. Power is selectively supplied to the motor 12 by pressing trigger 18.

A chuck assembly 20 of the present invention is mounted to the drive shaft 16. It is to be understood that the chuck assembly 20 of the present invention may be used with other rotary-driven tools, and that the drill 10 illustrated in FIG. 1 is one example of such tools. For example, screw drivers, nut drivers, burrs, mounted grinding stones, and other cutting or abrading tools may employ embodiments of the present invention.

When trigger 18 is pressed, motor 12 and drive shaft 16 drive a drill bit 24 that is retained in chuck assembly 20. As shown, a workpiece 26 has a portion 28 which constrains the work area. In accordance with the present invention, soft grip material 30 is shielded by ribs 32 to protect the soft grip material 30 from damage due to contact with constraining portion 28 of workpiece 26.

With reference to FIGS. 2–3, chuck assembly 20 will be described in detail. The chuck assembly 20 includes a typical chuck mechanism 38 having a chuck body member 40. Any mechanical chuck mechanism can be used to practice the invention. The chuck mechanism shown is simply used to illustrate a best mode of practicing the invention. The chuck body 40 includes forward and rearward sections 42 and 44, respectively. An axial bore 46 is formed in the forward section 42 of the chuck body 40. Axial bore 46 is somewhat larger than the largest tool shank which the chuck mechanism 38 is designed to accommodate. A threaded bore 48 is formed in the rearward section 44 of the chuck body 40, and is sized to mate with a threaded end of drive shaft (FIG. 1). If desired, the threaded bore 48 may be replaced by a tapered unthreaded bore sized to mate with a tapered drive shaft (not shown).

A plurality of jaws 50 extend through passageways 52 formed in the chuck body 40. Preferably, three jaws 50 are employed and each jaw is separated from the adjacent jaws by an arc of 120°. The axes of the passageways 52 and the jaws 50 are angled with respect to the chuck body axis 56, and intersect the chuck body axis 56 at a common point, indicated at A, ahead of the chuck body 40. Each jaw 50 has a tool-engaging surface 58 which is generally parallel to the axis 56 of the chuck body 40. Threads 60 are located on the outer surface of each jaw 50.

An adjustment ring 64 encircles the chuck body 40, and cooperates with the jaws 50. Threads 66 are provided on the inner surface of the adjustment ring 64 to mate with the threads 60 on the jaw outer surfaces.

By rotating the adjustment ring 64, the jaws 50 are caused to move toward or away from each other, dependent upon the direction of rotation of the adjustment ring 64. By rotating the adjustment ring 64, the jaws 50 can be positioned to secure bits of varying sizes.

With continuing reference to FIGS. 2–3, a bearing assembly 70 is provided to facilitate the rotation of the adjustment ring 64 with respect to the chuck body 40. The bearing assembly 70 includes a ball retainer 72 receiving bearing balls 74. Bearing balls 74 engage a bearing thrust ring 76. It is to be understood that any conventional chuck mechanism can be employed within a chuck assembly of the present invention, and that chuck mechanism 38 is one example of such assemblies.

A sleeve 80 is affixed to the adjustment ring 64, and encircles the adjustment ring 64. A press-fit may be used to affix the sleeve 80 to the adjustment ring 64. Preferably, the sleeve 80 is formed by injection molding a hard plastic material. The hard plastic material is a structural plastic such as polycarbonate, a filled polypropylene, e.g., glass-filled polypropylene, or a blend of structural materials. The adjustment ring 64 may also be provided with circumferential teeth to facilitate the press-fit.

The sleeve 80 has a plurality of spaced apart ribs 82 extending outward in the radial direction. An elastomeric grip 84 extends generally circumferentially about the sleeve 80. A plurality of openings 86 are defined by the grip 84. The ribs 82 radially protrude from the grip 84 at the openings 86. Preferably, the elastomeric grip 84 is formed of a natural or synthetic elastomer such as santoprene or vyram. In a preferred embodiment, the grip 84 is formed of an elastomeric material having a hardness of Shore 45A durometer to Shore 50D durometer, and most preferably about Shore 80A durometer. Further in a preferred embodiment, the ribs 82 protrude at least about 0.015 in (0.3 mm) from the grip outer surface 92.

As best shown in FIG. 3, the grip 84 includes a plurality of gripping portions 88 and a plurality of securing portions 90. Preferably, the grip 84 is formed by insert molding an elastomeric material about the sleeve 80. The gripping portions 88 are formed along an outer surface 92 of the sleeve 80; and, the ribs 82 are located between adjacent gripping portions 88. Securing portions 90 of the grip 84 are formed along the sleeve inner surface 94 at each of the ribs 82. The securing portions 90 are formed during the insert molding, and secure the grip 84 to the sleeve 80.

An optional rear sleeve 96 is affixed to chuck body 40. If desired, the rear sleeve 96 may be omitted and the front sleeve 80 extended to the rearward section 44 of chuck body 40. This alternative is feasible when a spindle lock is provided on the driver or when the driver motor is used to tighten or loosen the jaws.

In accordance with the present invention, the ribs 82 lie in outboard shielding relationship to the grip. In the embodiment shown in FIG. 3, the grip outer surface 92 is discontinuous at each rib 82, where the grip securing portions 84 are formed along the grip inner surface 94. Alternatively, grip outer surface 92 may be continuous at each rib 82, provided that the ribs 52 are shorter in length than the width of the grip 84.

With reference to FIGS. 4 and 5, an alternative embodiment of the present invention will be described. The chuck mechanism structure of the alternative embodiment is the same as that of the previously described embodiment. Accordingly, like elements have been indicated with like reference numerals. In the alternative embodiment, a grip 100 is slip-fit over the sleeve 80. The plurality of openings 102 defined by the grip 100 are apertures 102 through the grip 100. The ribs 82 radially protrude through the apertures 102 to shield the grip 100. As shown, the grip 100 has a continuous outer surface 104.

With reference to FIGS. 1–3, operation of chuck assembly 20 will be described. Drill bit 24 is received and secured in chuck mechanism jaws 50. While drilling a hole in workpiece 26, the user incidentally bumps work area constraining portion 28 of workpiece 26 with chuck assembly 20. The ribs 82 protrude radially outwardly from grip 84 to shield the elastomeric grip 84 from being damaged. The ribs 82 bounce off of workpiece portion 26, leaving the grip 30 undamaged.

It is to be appreciated that in addition to protecting the grip from wearing or tearing, the ribs provide a helpful gripping surface during the chucking and unchucking operations.

It will be recognized that the design features of the embodiments of the present invention are equally applicable to many different keyless chuck configurations. Embodiments of the present invention provide a keyless soft grip chuck assembly for use in a rotary power tool.

While the best mode for carrying out the invention has been described in detail, those familiar with the art to which this invention relates will recognize various alternative designs and embodiments for practicing the invention as defined by the following claims.

What is claimed is:

1. A chuck assembly comprising:
    a chuck mechanism including an adjustment ring and a plurality of spaced apart jaws, the jaw spacing being adjusted by rotation of the adjustment ring;
    a sleeve encircling and affixed to the adjustment ring, the sleeve having a plurality of spaced apart ribs radially extending therefrom; and
    an elastomeric grip extending generally circumferentially about the sleeve, the grip defining a plurality of openings, wherein the ribs radially protrude from the grip at the openings so as to lie in outboard shielding relationship to the grip.

2. The chuck assembly of claim 1 wherein the sleeve is formed by injection molding a hard plastic material.

3. The chuck assembly of claim 1 wherein the plurality of ribs protrude at least about 0.3 mm.

4. The chuck assembly of claim 1 wherein the grip is formed of an elastomeric material having a hardness of about Shore 80A durometer.

5. The chuck assembly of claim 1 wherein the grip is formed by insert molding an elastomeric material about the sleeve.

6. The chuck assembly of claim 5 wherein the grip includes a plurality of gripping portions and a plurality of securing portions, the ribs being located between adjacent gripping portions which are formed along an outer surface of the sleeve, the grip being secured to the sleeve at each of the ribs by the securing portions which are formed along an inner surface of the sleeve.

7. The chuck assembly of claim 6 wherein the grip has a discontinuous outer surface, the grip outer surface being discontinuous at each of the ribs.

8. The chuck assembly of claim 1 wherein the grip is slip-fit over the sleeve, and the plurality of openings are apertures, the ribs radially protruding through the apertures and the grip having a continuous outer surface.

9. The chuck assembly of claim 1 wherein the grip is a single continuous piece of elastomeric material.

10. A rotary power tool comprising:

a housing;

a motor disposed in the housing, the motor operatively rotating a drive shaft about a drive shaft axis;

a chuck mechanism mounted to the drive shaft for securing a bit, the chuck mechanism including an adjustment ring and a plurality of spaced apart jaws, the jaw spacing being adjusted by rotation of the adjustment ring;

a sleeve encircling and affixed to the adjustment ring, the sleeve having a plurality of spaced apart ribs radially extending therefrom; and an elastomeric grip extending generally circumferentially about the sleeve, the grip defining a plurality of openings, wherein the ribs radially protrude from the grip at the openings so as to lie in outboard shielding relationship to the grip.

11. The rotary power tool of claim 10 wherein the sleeve is formed by injection molding a hard plastic material.

12. The rotary power tool of claim 10 wherein the plurality of ribs protrude at least about 0.3 mm.

13. The rotary power tool of claim 10 wherein the grip is formed of an elastomeric material having a hardness of about Shore 80A durometer.

14. The rotary power tool of claim 10 wherein the grip is formed by insert molding an elastomeric material about the sleeve.

15. The rotary power tool of claim 14 wherein the grip includes a plurality of gripping portions and a plurality of securing portions, the ribs being located between adjacent gripping portions which are formed along an outer surface of the sleeve, the grip being secured to the sleeve at each of the ribs by the securing portions which are formed along an inner surface of the sleeve.

16. The rotary power tool of claim 15 wherein the grip has a discontinuous outer surface, the grip outer surface being discontinuous at each of the ribs.

17. The rotary power tool of claim 10 wherein the grip is slip-fit over the sleeve, and the plurality of openings are apertures, the ribs radially protruding through the apertures and the grip has a continuous outer surface.

18. A chuck assembly comprising:

a chuck mechanism including an adjustment ring and a plurality of spaced apart jaws, the jaw spacing being adjusted by rotation of the adjustment ring;

a sleeve formed by injection molding a hard plastic material, the sleeve encircling and affixed to the adjustment ring, and the sleeve having a plurality of spaced apart ribs radially extending therefrom; and an elastomeric grip formed generally circumferentially about the sleeve by insert molding an elastomeric material about the sleeve, the grip defining a plurality of openings, wherein the ribs radially protrude from the grip at the openings so as to lie in outboard shielding relationship to the grip.

19. The chuck assembly of claim 18 wherein the grip is a single continuous piece of elastomeric material.

20. The chuck assembly of claim 18 wherein the grip includes a plurality of gripping portions and a plurality of securing portions, the ribs being located between adjacent gripping portions which are formed along an outer surface of the sleeve, the grip being secured to the sleeve at each of the ribs by the securing portions which are formed along an inner surface of the sleeve.

\* \* \* \* \*